(12) United States Patent
Flickinger et al.

(10) Patent No.: US 6,418,121 B1
(45) Date of Patent: Jul. 9, 2002

(54) TRANSCEIVER CIRCUITRY FOR A GBIC MODULE

(75) Inventors: Steven L. Flickinger, Hummelstown; William L. Herb; Scott E. Schaeffer, both of Harrisburg; Richard D. Miller, Lancaster, all of PA (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/200,088

(22) Filed: Nov. 25, 1998

(51) Int. Cl.[7] ............................................. H04L 12/40
(52) U.S. Cl. ..................... 370/242; 709/250; 375/219
(58) Field of Search ................................. 370/241, 242, 370/244, 245, 284, 401, 419, 420, 463, 464, 465, 906; 709/249, 250; 375/219, 257; 327/27, 80, 81

(56) References Cited

U.S. PATENT DOCUMENTS 5,191,581 A * 3/1993 Woodbury et al. .......... 370/364
5,901,151 A * 5/1999 Bleiweiss et al. ........... 370/248
6,032,209 A * 2/2000 Mros et al. .................. 710/103

OTHER PUBLICATIONS

SFF–8055, Specification for GBIC (Gigabit Interface Converter), Rev. 5.5, pp. 1–66, Sep. 27, 2000.*

* cited by examiner

Primary Examiner—Wellington Chin
Assistant Examiner—Frank Duong

(57) ABSTRACT

Transceiver circuitry (10) for use in a GBIC module uses readily available off the shelf components to satisfy the specifications of the GBIC standard. A diode cross over quad (84) is utilized to extend the input range of a low input differential receiver (78). A voltage divider (98) and parallel transistors (94, 96, 100) are utilized to insure that the differential voltage of the received differential signal is at an acceptable level. A coaxial cable driver (60) designed to drive 50 ohms is utilized to drive 150 ohms.

7 Claims, 3 Drawing Sheets

US 6,418,121 B1

TRANSCEIVER CIRCUITRY FOR A GBIC MODULE

BACKGROUND OF THE INVENTION

This invention relates to transceiver circuitry for use in a Gigabit Interface Converter (GBIC) module.

Fibre Channel and Gigabit Ethernet are high speed data transfer interfaces that can be used to interconnect workstations, mainframes, supercomputers and storage devices. Supporting numerous channel and network Upper Level Protocols (ULPs), Fibre Channel allows faster data transfer over longer distances between a larger number of devices or communication points. The standard combines attributes of a channel with attributes of a network, thus providing a general transport vehicle for ULPs such as the Small Computer System Interface (SCSI), the Intelligent Peripheral Interface (IPI), the High Performance Parallel Interface (HIPPI), the Internet Protocol (IP), Ethernet (IEEE 802.3) and the Asynchronous Transfer Mode (ATM). Accommodating the pattern of ever increasing data rates, Fibre Channel is a scalable interconnect standard that considers all aspects of speed, length and media (copper and fiber). Fibre Channel development is focused on data transfer at 1.0625 Gbits/sec with provisions for 2.125 Gbits/sec and 4 Gbits/sec.

AMP Incorporated of Harrisburg, Pa., Compaq Computer Corporation of Houston, Tex., Vixel Corporation of Bothell, Wash. and Sun Microsystems Computer Company of Mountain View, Cali. have together agreed on and written a standard for a serial transceiver module, which is called the Gigabit Interface Converter (GBIC) module. The module provides a single small form factor for a wide variety of standard Fibre Channel connectors and transmission media. The module can be inserted in or removed from a host or switch chassis without first removing power from the receiving socket. Any copper and optical transmission technologies consistent with the form factor can be used.

The GBIC module has a plug in a first insulative housing and a receptacle in a second insulative housing at respective opposite ends of the module. A printed circuit board containing transceiver circuitry is secured to, and connects, the plug and the receptacle. The module is insertable into a guide structure mounted to a host board and having a receiving end and a terminating end. The terminating end of the guide structure has a receptacle for mating engagement with the module plug when the module is fully inserted in the guide structure. The guide structure houses and aligns the module and provides polarized guide rails to prevent incorrect installation of the module and is designed to accept the side retention latches specified in the GBIC module standard.

The standard for the GBIC module sets signal specifications for all positions of the module plug and receptacle. In particular, the GBIC is driven from the host board with serial differential positive emitter coupled logic (PECL) signals applied to a pair of transmission data leads. When the transmission medium is wire, rather than fiber, the transmission data signals drive a transmission conversion circuit providing a standard serial output. The transmission conversion circuit should be designed to drive up to thirty (30) meters of copper wire. The serial receiver on the GBIC module board detects incoming signals and amplifies and converts them to provide to the host board serial differential PECL data signals on a pair of receive data leads. Various control and status signals are also specified in the GBIC module standard. For example, a receive loss of signal (RX_LOS) indication is generated when the incoming data signal amplitude is not sufficient to achieve the specified bit error rate or to indicate loss of power at the receiver circuit. A transmission fault signal is generated to indicate a failure has been detected in the transmission conversion circuit or to indicate loss of power at the transmit circuit. The output from the transmission conversion circuit is also disabled in response to a transmit disable signal generated by the host.

SUMMARY OF THE INVENTION

Transceiver circuitry according to the present invention is adapted for use in a gigabit interface converter module to process receive and transmit signals in a differential format. The circuitry is installed between, and coupled to, a plug connected to a host and a receptacle connected to a transmission medium. The host provides to the circuitry power and differential signals for transmission and the circuitry provides to the transmission medium amplified differential transmission signals. The transmission medium provides to the circuitry received differential signals and the circuitry provides to the host a signal detect indication when the differential of the received differential signals falls below a predetermined differential threshold and when the received differential signals switch at greater than a predetermined rate. The circuitry further provides to the host amplified differential signals corresponding to the differential signals provided to the circuitry by the transmission medium. The inventive circuitry comprises a current supply and an operational amplifier having an inverting input, a non-inverting input and an output. A first controllable switching element is coupled to the current supply and to the non-inverting input of the operational amplifier. A second controllable switching element is coupled to the current supply and to the inverting input of the operational amplifier. A third controllable switching element is coupled to the current supply and to the inverting input of the operational amplifier. The second controllable switching element has a control terminal coupled to receive a first of the differential signals provided by the transmission medium and the third controllable switching element has a control terminal coupled to receive a second of the differential signals provided by the transmission medium. The control terminals of the second and third controllable switching elements are further coupled to a fixed bias voltage and the control terminal of the first controllable switching element is coupled to a bias voltage equal to the fixed bias voltage plus one half the predetermined differential threshold. Accordingly, the output of the operational amplifier is at a first level when the differential of the received differential signals exceeds the predetermined differential threshold and is at a second level when the differential of the received differential signals is less than the predetermined differential threshold.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 4 shows the format and voltage levels of the receive signals applied to the loss of signal detect circuitry and is useful for understanding the inventive circuitry.

DETAILED DESCRIPTION

Figure 1:
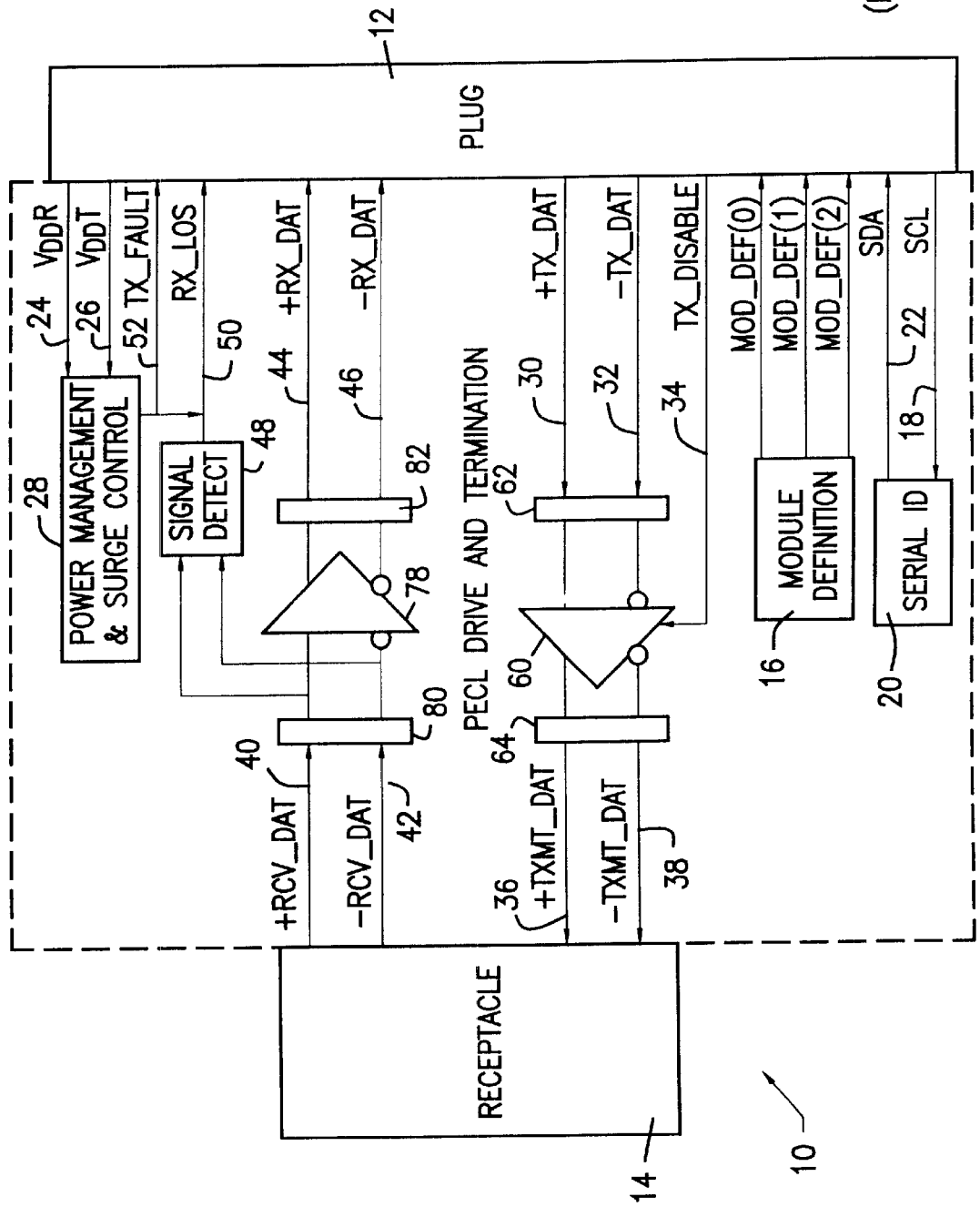
FIG. 1 is a block diagram of transceiver circuitry according to the GBIC module standard.

FIG. 1 is a block diagram of the GBIC module transceiver circuitry, designated generally by the reference numeral 10, according to the GBIC module standard. As shown, the transceiver circuitry 10 is connected at one end to a plug 12 adapted for connection to the host, and at the other end to a receptacle 14 adapted for connection to a transmission medium (copper wire in the case of the inventive circuitry). The positions of the various signal leads within the plug 12 and the receptacle 14 are set forth in the GBIC module standard.

As shown, the particular type of module is defined by three binary signals at the output of the module definition circuit 16, so that eight possible types of modules can be defined. Each module can have its own unique identification number which is available to the host by applying a serial clock on the clock lead 18 to the serial ID circuit 20, which in turn provides serial identification data to the host over the lead 22.

Power for the transceiver circuitry is provided by the host over the leads 24, 26 to the power management and surge control circuit 28. The host also provides transmission data differential signals over the leads 30, 32 and a transmission disable signal over the lead 34 when transmission by the GBIC module is to be disabled. The transceiver circuitry 10, in the absence of the transmission disable signal on the lead 34, amplifies the transmission data signals received over the leads 30, 32 and provides them to the transmission media as amplified differential signals on the leads 36, 38.

The transceiver circuitry 10 receives from the transmission medium receive differential data signals on the leads 40, 42. These signals are amplified and provided to the host over the leads 44, 46. At the same time, the received differential signals are provided to the signal detect circuit 48. The signal detect circuit 48 analyzes the received signals to determine whether the received signal amplitude and switching rate are acceptable to achieve the specified bit error rate. If these characteristics are unacceptable, a loss of signal indication is provided over the lead 50. In addition, the power management and surge control circuit 28 provides a transmission fault signal to the host over the lead 52 when the power received from the host is not stable.

The GBIC module standard sets forth detailed specifications for the timing and voltage levels of all of the signals passing between the transmission medium and the transceiver circuitry 10 and between the host and the transceiver circuitry 10. However, the GBIC module standard provides the designer with freedom to design transceiver circuitry 10 which meets those specifications.

Figure 2:
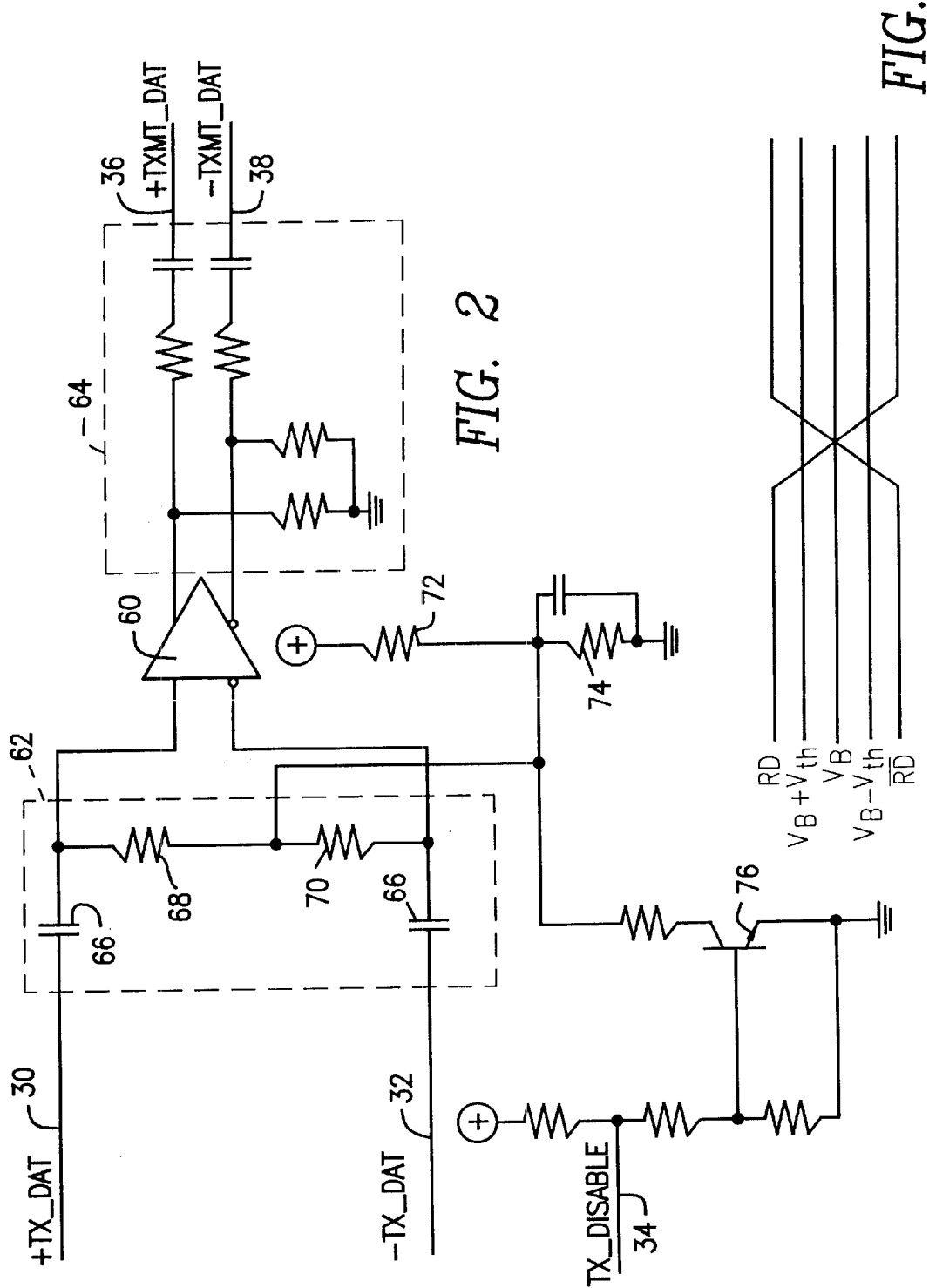
FIG. 2 is a schematic circuit diagram of inventive transmit circuitry including transmit disable circuitry.

Referring now to FIG. 2, the transmit circuitry includes a differential line driver 60 coupled through the input termination circuitry 62 to receive the transmission data signals from the host on the leads 30, 32 and is coupled through the output termination circuit 64 to provide amplified differential signals to the transmission media on the leads 36, 38. The output termination circuitry 64 filters the differential transmission signals and balances them around ground. The input termination circuitry 62 includes capacitors 66 to eliminate DC levels and has the junction of series connected equal resistors 68, 70 coupled to a bias voltage provided by the divider network including the resistors 72, 74 to shift the transmit data differential signals on the leads 30, 32 to a range that the driver 60 operates in. The differential line driver 60, which illustratively is a coaxial cable driver, boosts the 650 mv signal provided by the host over the leads 30, 32 to a 1200 mv signal on the leads 36, 38 which is capable of driving thirty meters of copper cable. The inventive transmit circuitry responds to a transmission disable signal on the lead 34 to bring the junction of the resistors 68, 70 to ground level so that the signals applied to the driver 60 are outside the useable range. Under normal operating conditions, the transmit disable signal on the lead 34 is low, maintaining the transistor 76 non-conductive. However, when the transmit disable signal on the lead 34 is brought high by the host, the transistor 76 conducts, grounding the junction of the resistors 68, 70 and disabling operation of the driver 60.

Figure 3:
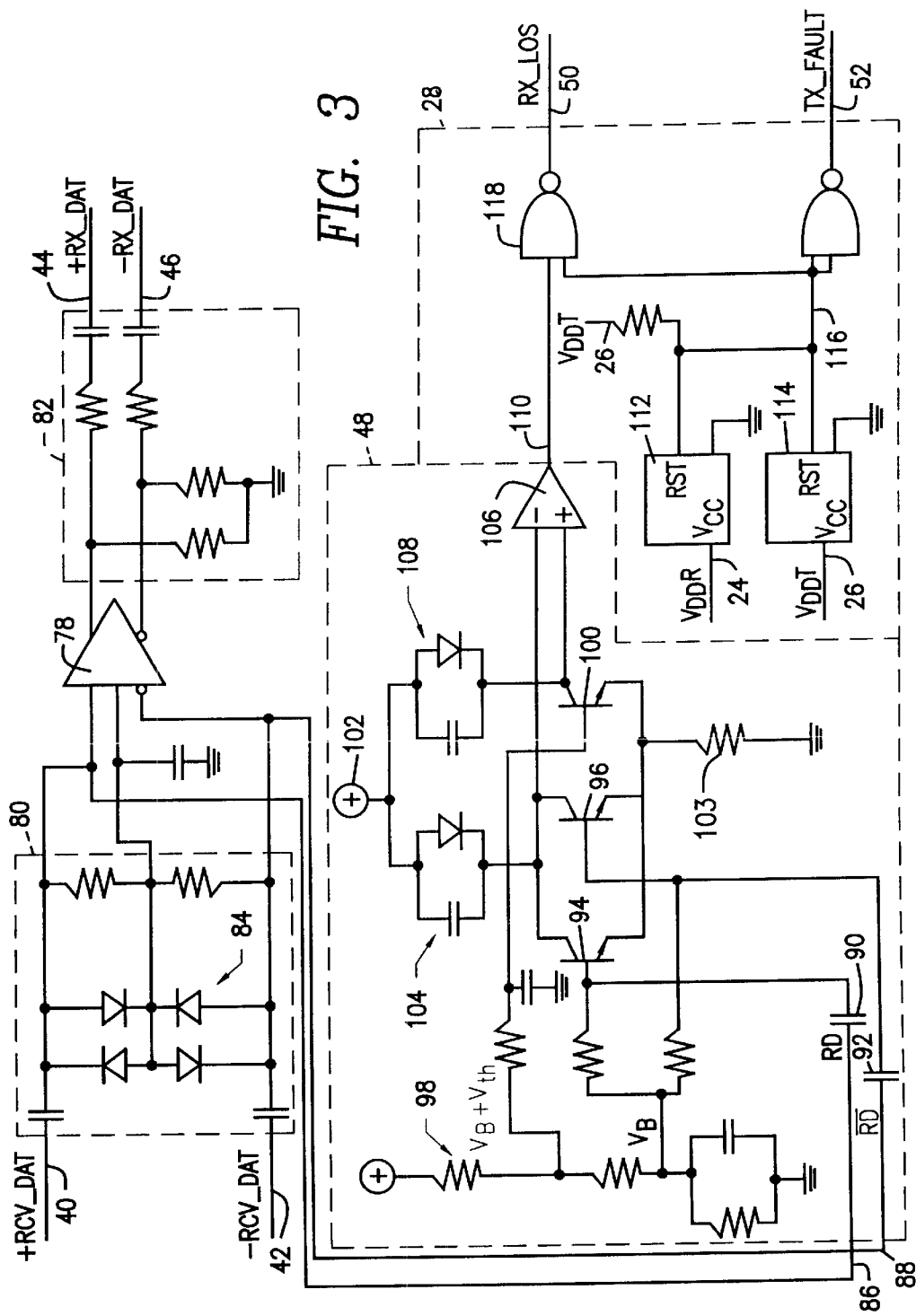
FIG. 3 is a schematic circuit diagram of inventive receive circuitry showing the loss of signal detect circuitry and the power management and surge control circuitry.

As shown in FIG. 3, the differential data signals received from the transmission medium on the leads 40, 42 are applied to the differential receiver 78, through the input termination circuitry 80. The output from the differential receiver 78 is provided, through the output termination circuitry 82, to the host over the leads 44, 46. The input termination circuitry 80 includes a diode array 84 connected to clip the incoming received signal so that it remains below levels which the receiver 78 can tolerate.

The output from the termination circuitry 80 is also provided as an input to the signal detect circuitry 48 over the leads 86, 88, labeled RD and $\overline{RD}$, respectively. FIG. 4 shows the format and voltage levels of the signals RD and $\overline{RD}$. As is conventional, the differential signals RD and $\overline{RD}$ are equally spaced about a baseline voltage $V_B$. In order to be acceptable, these differential signals have to be separated from the baseline voltage $V_B$ by a minimum threshold voltage $V_{th}$. Illustratively, to insure that the incoming signal amplitude is acceptable, $V_{th}$ is set at 75 mv.

The signals RD and $\overline{RD}$ are applied to the signal detect circuitry 48, where they must pass through the capacitors 90, 92, which maintain the baseline voltage $V_B$ and block unwanted DC signals. The signals are then provided to the bases of the transistors 94, 96, where they are added to the voltage $V_B$ provided by the voltage divider 98. The voltage divider 98 provides the voltage $V_B+V_{th}$ to the base of the transistor 100. The collectors of the transistors 94, 96 are tied together and are connected to the voltage source 102 through the filter network 104. In addition, the collectors of the transistors 94, 96 are connected to the inverting input of the comparator 106. The collector of the transistor 100 is connected to the voltage source 102 through the filter network 108 and is also directly connected to the non-inverting input of the comparator 106. The voltage source 102 in series with the resistor 103 to ground functions as a current source. Accordingly, if the voltage levels of the signals RD and $\overline{RD}$ are not spaced from the base line voltage $V_B$ by at least the threshold voltage $V_{th}$, only the transistor 100 will conduct. When the signals RD and $\overline{RD}$ are at an acceptable level, the transistors 94 and 96 will alternately conduct and the transistor 100 will not conduct. The filter networks 104, 108 eliminate transient switching due to the switching time of the differential signals RD and $\overline{RD}$. Thus, the output of the comparator 106 on the lead 110 is high when the incoming signal level is acceptable and is low when the incoming signal level is unacceptable.

The power management and surge control circuit 28 receives power from the host on the leads 24, 26, which are applied to the reset circuits 112, 114, respectively, which are illustratively MAX 6315 open-drain SOT microprocessor reset circuits manufactured by Maxim Corporation. These reset circuits 112, 114 provide a low signal on the lead 116 until the power provided by the host is stable. Conversely, the transmission fault signal to the host on the lead 52 is high until the power stabilizes.

The signals on the leads 110 and 116 are also applied as inputs to the NAND gate 118, whose output on the lead 50 is the loss of signal lead to the host. Thus, the signal on the lead 50 is high either if the signal received over the transmission medium is unacceptable or if the power provided by the host is not stable.

Accordingly, there has been disclosed improved transceiver circuitry for use in a GBIC module. Several aspects of the present invention provide an advantageous result. For example, the diode array 84, which is fashioned from a cross over quad circuit, extends the input range of the differential receiver 78 to allow use of a low input differential receiver. The signal detect circuit 48 insures that the peak-to-peak differential voltage is greater than twice $V_{th}$ and the switching rate is at an acceptable level. In the-transmit circuit shown in FIG. 2, an economical coaxial cable driver 60 designed to drive 50 ohms is used to drive 150 ohms.

Thus, while an illustrative embodiment of the present invention has been disclosed herein, it is understood that various modifications and adaptations to the disclosed circuitry will be apparent to one of ordinary skill in the art and it is intended that this invention be limited only by the scope of the appended claims.

What is claimed is:

1. Transceiver circuitry adapted for use in a gigabit interface converter module to process receive and transmit signals in a differential format, the circuitry being installed between and coupled to a plug connected to a host and a receptacle connected to a transmission medium, wherein the host provides to the circuitry power and differential signals for transmission, wherein the circuitry provides to the transmission medium amplified differential transmission signals, wherein the transmission medium provides to the circuitry received differential signals, wherein the circuitry provides to the host a signal detect indication when the differential of the received differential signals falls below a predetermined differential threshold and when the received differential signals switch at greater than a predetermined rate, and wherein the circuitry further provides to the host amplified differential signals corresponding to the differential signals provided to the circuitry by the transmission medium, the circuitry comprising:

a comparator having an inverting input, a non-inverting input and an output;

a source of current;

a first controllable switching element coupled to said current source and to the non-inverting input of said comparator;

a second controllable switching element coupled to said current source and to the inverting input of said comparator, said second controllable switching element having a control terminal coupled to receive a first of the differential signals provided by the transmission medium; and a third controllable switching element coupled to said current source and to the inverting input of said comparator, said third controllable switching element having a control terminal coupled to receive a second of the differential signals provided by the transmission medium;

wherein the control terminals of the second and third controllable switching elements are further coupled to a fixed bias voltage and the control terminal of the first controllable switching element is coupled to a bias voltage equal to said fixed bias voltage plus one half said predetermined differential threshold;

whereby the output of said comparator is at a first level when the differential of the received differential signals exceeds said predetermined differential threshold and is at a second level when the differential of the received differential signals is less than said predetermined differential threshold.

2. The circuitry according to claim 1 wherein:

said current source includes a voltage source and a resistor connected to ground;

said first controllable switching element includes a first NPN transistor having its collector coupled to said voltage source through a first diode, its collector further coupled to said comparator non-inverting input, its emitter coupled to said resistor, and its base coupled to said bias voltage;

said second controllable switching element includes a second NPN transistor having its collector coupled to said voltage source through a second diode, its collector further coupled to said comparator inverting input, its emitter coupled to said resistor, and its base coupled to said fixed bias voltage and to said transmission medium to receive said first of the differential signals provided to the circuitry by the transmission medium; and said third controllable switching element includes a third NPN transistor having its collector coupled to said voltage source through said second diode, its collector further coupled to said comparator inverting input, its emitter coupled to said resistor, and its base coupled to said fixed bias voltage and to said transmission medium to receive said second of the differential signals provided to the circuitry by the transmission medium.

3. The circuitry according to claim 2 further comprising:

a power reset circuit responsive to the power provided by the host for providing a power reset signal at a first level when power is initially provided and until the power has stabilized, and at a second level after the power has stabilized; and a gate having first and second inputs and an output, wherein said gate first input is coupled to receive said power reset signal, wherein said gate second input is coupled to said comparator output, wherein said gate output is coupled to said host, and wherein said gate is arranged so that said gate output is at a first level when the power has stabilized and the differential of the received differential signals exceeds said predetermined differential threshold.

4. The circuitry according to claim 1 further comprising:

a series connection of two pairs of antiparallel diodes coupled between the differential signals provided to the circuitry by the transmission medium; and a differential receiver coupled to receive the differential signals provided to the circuitry by the transmission medium and to provide corresponding amplified differential signals to the host;

whereby said series connection functions to clip the differential signals provided to the circuitry by the transmission medium.

5. The circuitry according to claim 1 further comprising:

a transmission amplifier coupled between said host and said transmission medium, said transmission amplifier having a pair of differential inputs coupled to receive from said host said differential signals for transmission and said amplifier providing corresponding amplified differential transmission signals to said transmission medium;

a pair of series connected resistors connected across said amplifier differential inputs;

a voltage divider connected to the junction of said pair of resistors to provide a bias voltage for shifting the range of said differential signals for transmission; and a disable circuit coupled to the junction of said pair of resistors and responsive to a disable signal received from the host for pulling said junction to ground so as to disable said transmission amplifier.

6. Receive loss of signal circuitry adapted for use in a gigabit interface converter module to analyze received signals in a differential format, the circuitry being installed between and coupled to a plug connected to a host and a receptacle connected to a transmission medium, wherein the transmission medium provides to the circuitry received differential signals, and wherein the circuitry provides to the host a signal detect indication when the differential of the received differential signals falls below a predetermined differential threshold and when the received differential signals switch at greater than a predetermined rate, the circuitry comprising:

a comparator having an inverting input, a non-inverting input and an output;

a source of current;

a first controllable switching element coupled to said current source and to the non-inverting input of said comparator;

a second controllable switching element coupled to said current source and to the inverting input of said comparator, said second controllable switching element having a control terminal coupled to receive a first of the differential signals provided by the transmission medium; and a third controllable switching element coupled to said current source and to the inverting input of said comparator, said third controllable switching element having a control terminal coupled to receive a second of the differential signals provided by the transmission medium;

wherein the control terminals of the second and third controllable switching elements are further coupled to a fixed bias voltage and the control terminal of the first controllable switching element is coupled to a bias voltage equal to said fixed bias voltage plus one half said predetermined differential threshold;

whereby the output of said comparator is at a first level when the differential of the received differential signals exceeds said predetermined differential threshold and is at a second level when the differential of the received differential signals is less than said predetermined differential threshold.

7. The circuitry according to claim 6 wherein:

said current source includes a voltage source and a resistor connected to ground;

said first controllable switching element includes a first NPN transistor having its collector coupled to said voltage source through a first diode, its collector further coupled to said comparator non-inverting input, its emitter coupled to said resistor, and its base coupled to said bias voltage;

said second controllable switching element includes a second NPN transistor having its collector coupled to said voltage source through a second diode, its collector further coupled to said comparator inverting input, its emitter coupled to said resistor, and its base coupled to said fixed bias voltage and to said transmission medium to receive said first of the differential signals provided to the circuitry by the transmission medium; and said third controllable switching element includes a third NPN transistor having its collector coupled to said voltage source through said second diode, its collector further coupled to said comparator inverting input, its emitter coupled to said resistor, and its base coupled to said fixed bias voltage and to said transmission medium to receive said second of the differential signals provided to the circuitry by the transmission medium.

* * * * *